United States Patent [19]
Hyatt et al.

[11] Patent Number: 5,829,229
[45] Date of Patent: Nov. 3, 1998

[54] RECYCLABLE PACKAGING SYSTEM AND PROCESS FOR USING THE SAME

[75] Inventors: Dennis Michael Hyatt; John Stephen O'Connell, both of Boynton Beach, Fla.

[73] Assignee: Motorola, Inc., Schaumburg, Ill.

[21] Appl. No.: 825,983

[22] Filed: Apr. 4, 1997

[51] Int. Cl.$^6$ ............................................. B65P 35/54
[52] U.S. Cl. ............................ 53/445; 53/472; 53/474; 53/475
[58] Field of Search .................. 29/784, 799; 53/50, 53/155, 238, 240, 445, 468, 474, 475, 472

[56] References Cited

U.S. PATENT DOCUMENTS

| | | |
|---|---|---|
| 4,069,938 | 1/1978 | Palte et al. ........................ 206/597 X |
| 4,790,120 | 12/1988 | Manduley et al. ........................ 53/468 |
| 4,815,190 | 3/1989 | Haba et al. ........................ 29/430 |
| 4,848,062 | 7/1989 | Manduley et al. ........................ 53/473 X |
| 4,881,356 | 11/1989 | Beezer et al. ........................ 53/240 X |
| 4,884,330 | 12/1989 | Sticht ........................ 29/450 |
| 4,934,126 | 6/1990 | Wiegand et al. ........................ 53/474 X |
| 4,949,528 | 8/1990 | Palik ........................ 53/429 |
| 5,131,212 | 7/1992 | Grey et al. . |
| 5,146,732 | 9/1992 | Grey et al. . |
| 5,235,795 | 8/1993 | DeBusk ........................ 53/474 X |
| 5,247,747 | 9/1993 | Grey et al. . |
| 5,456,061 | 10/1995 | Grey et al. . |
| 5,469,691 | 11/1995 | Grey et al. . |
| 5,469,692 | 11/1995 | Xanthopoulos ........................ 53/474 |
| 5,542,237 | 8/1996 | Grey et al. ........................ 53/472 |
| 5,666,782 | 9/1997 | Prospero et al. ........................ 53/118 X |
| 5,682,728 | 11/1997 | DeBurk et al. ........................ 53/474 X |

*Primary Examiner*—Daniel B. Moon
*Attorney, Agent, or Firm*—Philip P. Macnak

[57] ABSTRACT

A process (100) for transporting goods between a component manufacturer (102), a product manufacturer (104), and a purchaser (106) includes the steps of:

(a) providing a tray (200, 300) having a plurality of compartments (208) which retain securely components (402, 404) manufactured by the component manufacturer (102), and further which retain securely product (502) manufactured by a product manufacturer (104);

(b) shipping the tray (200, 300) with components (402, 404) securely retained to the product manufacturer (104);

(c) utilizing the components (402, 404) in the manufacture of the product (502);

(e) shipping the tray (200, 300) with the product (502) securely retained to the purchaser (106);

(f) returning the tray (200, 300) to the component manufacturer (102) after the product (502) has been removed from the tray (200, 300). The process (100) can be managed by a resource manger (108) who tracks the inventory and distribution of trays.

20 Claims, 7 Drawing Sheets

FIG.4
SECTION 2-2

FIG.5
SECTION 2-2

RECYCLABLE PACKAGING SYSTEM AND PROCESS FOR USING THE SAME

FIELD OF THE INVENTION

This invention relates in general to packaging systems used for the transporting of goods, and in particular to a recyclable packaging system used for transporting goods between a component manufacturer, a product manufacturer and a purchaser.

BACKGROUND OF THE INVENTION

In the past, component manufacturers, such as molders of plastic parts, have either specified the packaging to be used to ship components, such as plastic housings for communication devices, to a product manufacturer, or the product manufacturer has specified the packaging to be used by the component manufacturers to ship the components to the product manufacturer. In either case, the packaging specified was very often not intended to be recycled, and was put into the trash after the components were used by the product manufacturer, resulting in a significant volume of waste material being placed into a landfill. The problem was alleviated to some extent by using custom trays which were designed to transport the components from the component manufacturer to the product manufacturer, and which could be returned to the component manufacturer after the components were used by the product manufacturer Unfortunately, such a system placed a severe burden on the component manufacturer to have on hand a sufficient number of trays to transport, on an ongoing basis, the components from the component manufacturer to the product manufacturer. The problem of insuring that there would be sufficient trays to transport the components was aggravated by the product manufacturer either by only infrequently returning the trays to the component manufacturer, or worse yet, by scrapping trays which should have been returned. As a result, a significant cost factor had to be added to the component price by the component manufacturer to recover the cost of the trays being used to ship the components to the product manufacturer.

Likewise, the product manufacturer has generally specified the packaging to be used to ship a product, such as a pager or cellular telephone, to a purchaser, typically a radio common carrier which provides a paging or cellular telephone service, or a retail establishment which merchandises the product to a consumer or end user. Again, much of the packaging was not intended to be recycled and was put into the trash by the purchaser, be it the radio common carrier, the retail establishment, or the end user. When the shipments to the purchaser were bulk shipments of a large number of product, the result was again a significant volume of waste material being placed into a landfill. The cost of the packaging for transportation of the product also added a cost factor which was added to the product price by the product manufacturer to recover the cost of the packaging.

At least one company offers a recyclable shipping container which is used to ship a product from the product manufacturer to the consumer/end user and allows the consumer/end user in turn to then ship the empty shipping container back to a recycling center where the shipping container is refurbished for use another time or is recycled. Unfortunately, the shipping container is designed to hold only the product, and is not suitable for use for shipping components from the component manufacturer to the product supplier.

Thus what is needed is a recyclable packaging system which enables components to be transported from a component manufacturer to a product manufacturer, and which can be further utilized to transport a product to the product purchaser. What is also needed is a recyclable packaging system which can be utilized to transport a variety of different components having essentially the same size and shape, and which can also be utilized to securely transport a variety of different products having essentially the same size and shape to the purchaser. What is also needed is a recyclable packaging system which minimizes the number of packaging components required to be used, while providing protection to the components and to the product while the components and the product are being transported.

DESCRIPTION OF THE PREFERRED EMBODIMENTS

Figure 1:
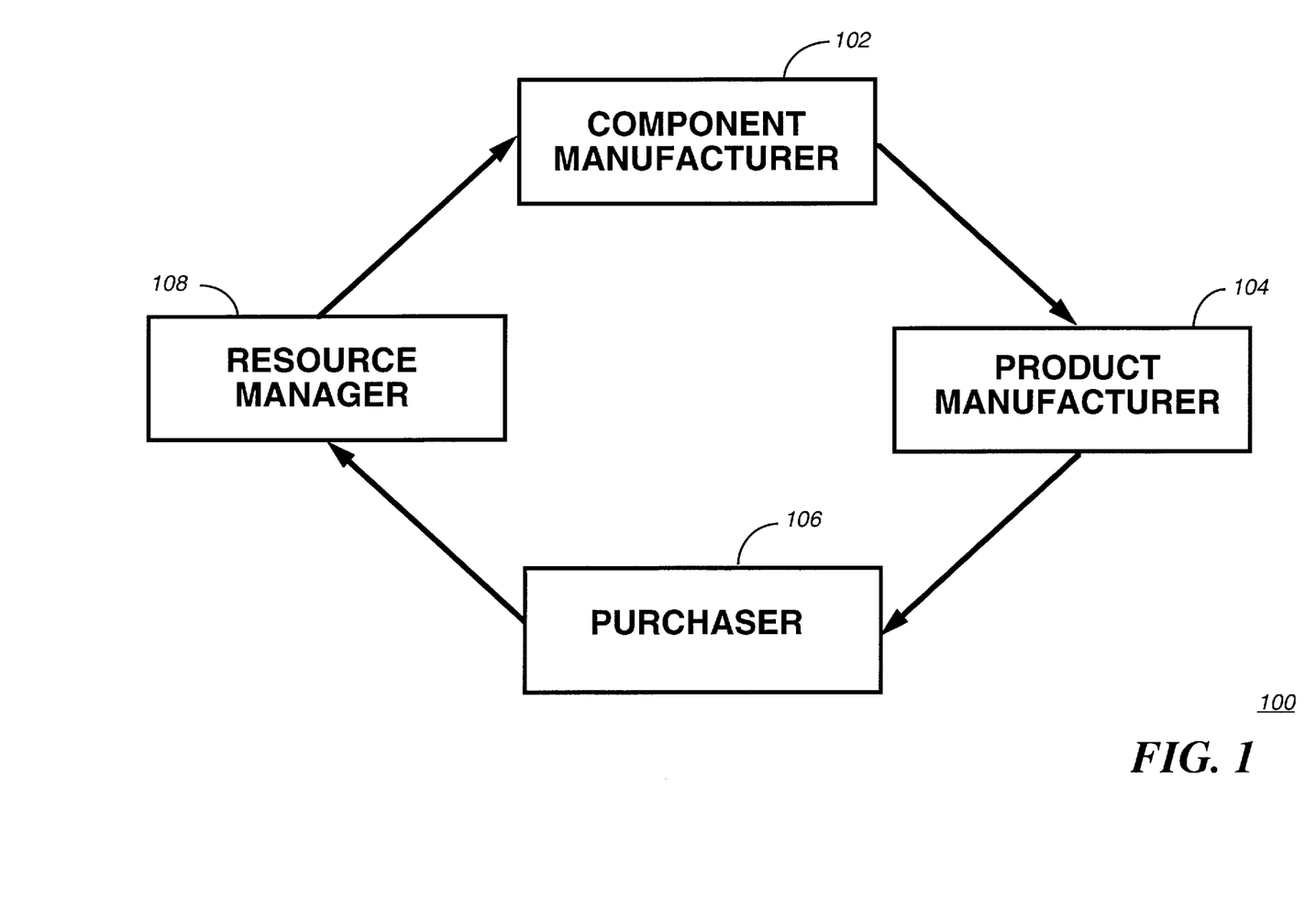
FIG. 1 is a flow diagram 100 which describes a process for transporting goods utilizing a recyclable packaging system in accordance with the preferred embodiment of the present invention.

FIG. 1 is a flow diagram 100 which illustrates a process for transporting goods utilizing a recyclable packaging system in accordance with the preferred embodiment of the present invention. Trays, which will be described below, are provided to a component manufacturer 102, such as a molder of plastic parts, who uses the trays to retain securely components, such as plastic housings, which are to be transported to a product manufacturer 104, such as a communication equipment manufacturer. The product manufacturer 104 in turn uses the trays to retain securely a product, such as a pager or cellular telephone, to be transported to a purchaser 106, such as a radio common carrier or retail establishment which merchandises the product to a consumer or end user. The purchaser 106 in turn preferably returns the trays to a resource manager 108 who carries an inventory of trays for use by the component manufacturer 102 and the product manufacturer 104. As can be seen from FIG. 1, the recyclable packaging system flow from component manufacturer 102 to product manufacturer 104 to purchaser 106 to resource manager 108 and back to the component manufacture 102 is a closed loop system and, unlike the prior art, encompasses the entities that manufactures components or products and which provides the product to the end user, This closed loop system allows trays which are used to provide a bulk shipment of components to a product manufacture 104, to be used to provide a bulk shipment of product to purchasers 106. The trays are then returned to the resource manager 108 who processes the trays to be usable again by the component manufacturer 102, as will be described below.

In an alternate embodiment of the present invention, the function of the resource manager, to be described in detail below, can be provided by the product manufacturer 104, in which case the trays are provided by the product manufacturer 104 to the component manufacturer 102 who uses the trays to retain securely components which are to be transported to the product manufacturer 104. The product manufacturer 104 in turn uses the trays to retain securely a product to be transported to the purchaser 106, who merchandises the product to an end user. The purchaser 106 in turn returns the empty trays to the product manufacturer 104 who in turn carries the inventory of trays for use by the component manufacturer 102.

Figure 2:
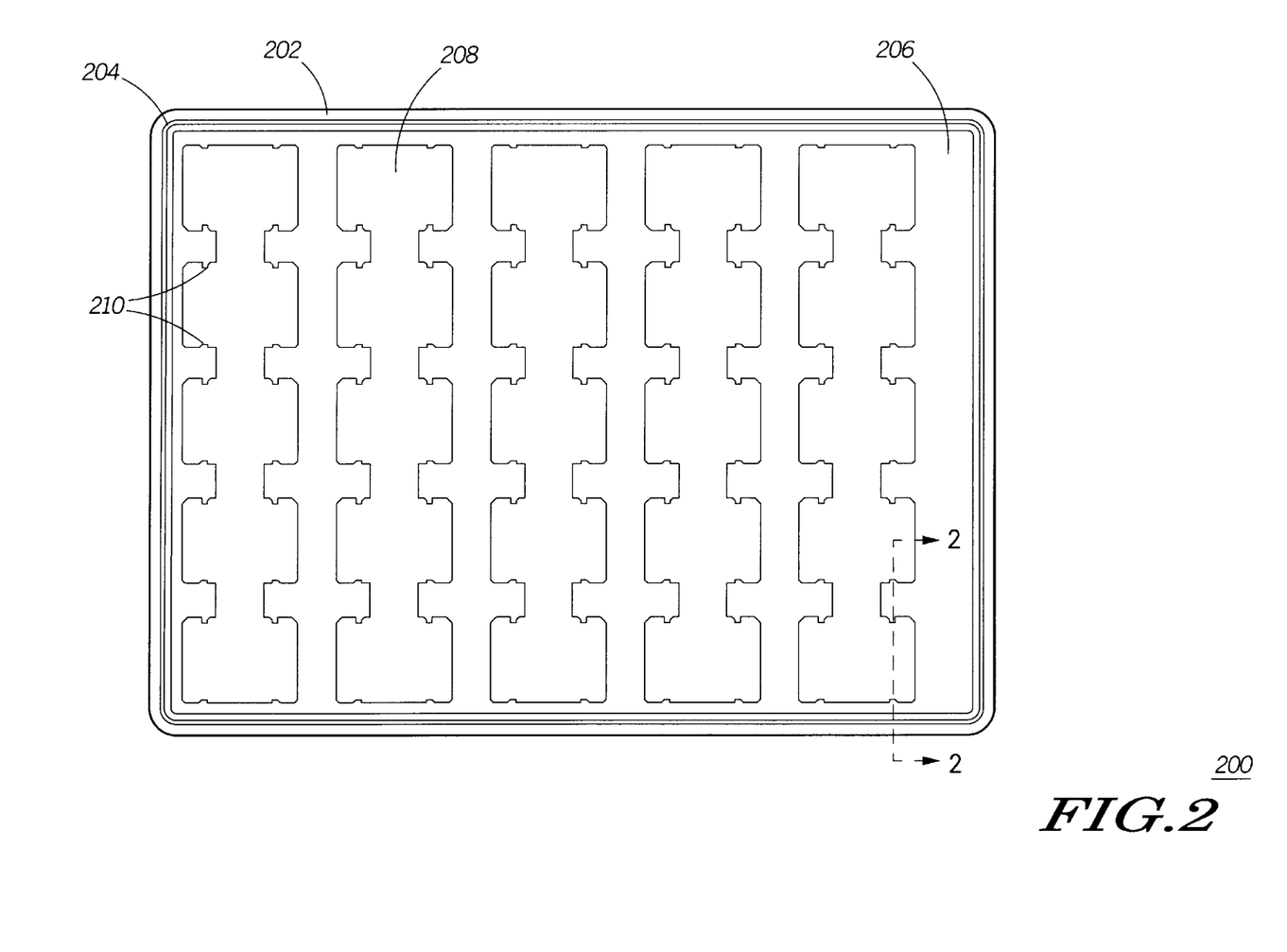
FIG. 2 is a plan view of a first embodiment of a tray used in the recyclable packaging system in accordance with the preferred embodiment of the present invention.

FIG. 2 is a plan view of a first embodiment of a tray 200 used in the recyclable packaging system in accordance with the preferred embodiment of the present invention. The tray 200 is manufactured using vacuum molding techniques using a 100% post consumer recycled plastic material, such as high density polyethylene (HDPE) having an SPI (Society of Plastics Industries) recycle code of 2. By way of example, alternate 100% post consumer recycled plastic materials suitable for use include Polyvinyl Terephthalate having an SPI recycle code of 1 and Polyvinyl chloride having an SPI recycle code of 3. The tray 200 is used to provide bulk shipping capability of components from a component manufacture to a product manufacturer, and further to provide bulk shipping capability from the product manufacturer to a purchaser of the product.

The tray 200 includes a rim 204 which is raised over a planar edge surface 202 and a planar top surface 206 of the tray. The rim 204 enables trays to be conveniently stacked. The tray includes a plurality of compartments 208, which by way of example, twenty-five compartments are shown in FIG. 2. Each of the plurality of compartments 208 includes a plurality of protrusions 210, four of which are shown by way of example in each compartment. The protrusions 210 can retain securely components which are manufactured by the component manufacturer 102, and also can retain securely a product manufactured by the product manufacturer 104. Section 2—2 is a cross-section through the protrusions 210 to be described below. It will be appreciated that the number of compartments within the tray can vary depending upon the overall size of the tray, and the size of the components and product being retained within the compartments 208.

Figure 3:
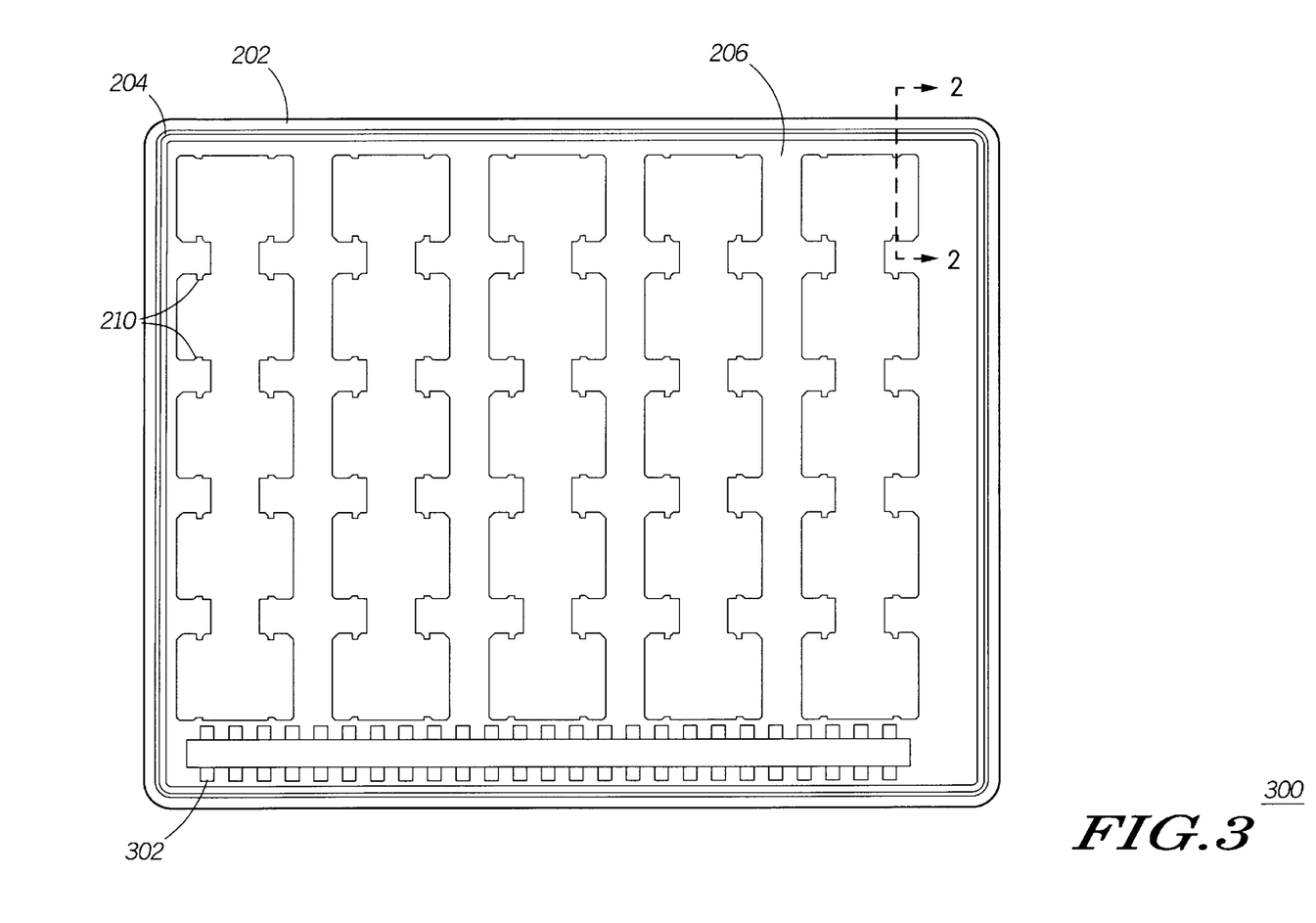
FIG. 3 is a plan view of a second embodiment of a tray used in the recyclable packaging system in accordance with the preferred embodiment of the present invention.

FIG. 3 is a plan view of a second embodiment of a tray 300 used in the recyclable packaging system in accordance with the preferred embodiment of the present invention. The tray 300 is manufactured using vacuum molding techniques using a 100% post consumer recycled plastic material, as described above. Tray 300 differs from tray 200 in that the tray includes a plurality of pockets 302 which can hold an additional component. The additional pockets 302 would not generally be utilized by the component manufacturer, but rather by the product manufacturer. In such an instance, the additional pockets 302 can retain a component, such as a battery, when the product being transported within the tray 300 is a battery powered communication device, such as a pager. It will be appreciated that the additional pockets can be utilized to retain other components other than batteries.

Figure 4:
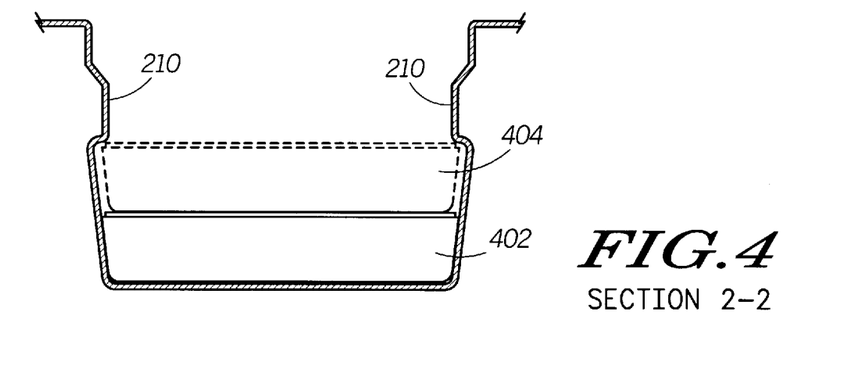
FIG. 4 is a cross-sectional view of the tray of FIG. 2 or FIG. 3 used to securely transport components in the recyclable packaging system in accordance with the preferred embodiment of the present invention.

FIG. 4 is a cross-sectional view of the tray 200 of FIG. 2 or tray 300 of FIG. 3 used to securely transport components in the recyclable packaging system in accordance with the preferred embodiment of the present invention. As described above, components, such as plastic housings can be securely retained within the compartments 208 of the trays. The depth of the compartments 208 is such as to securely retain at least one component 402, such as one half of a plastic housing. In general, the depth of the compartment 208 is such as to securely retain a second component 404, such as the same or other half of a plastic housing as well. Protrusions 210 narrow the opening within the compartment 208 sufficiently to prevent the single component or the multiple components from popping out of the tray. The protrusions 210 are of such a dimension and cross-sectional thickness so as to be able to be crushed, thereby providing a compression fit to retain the component(s) within the compartment. Because of the characteristics of the plastic materials utilized, the prolusions 210 which have been crushed will return to substantially the original dimensions after the component(s) have been removed from the compartment 208.

Figure 5:
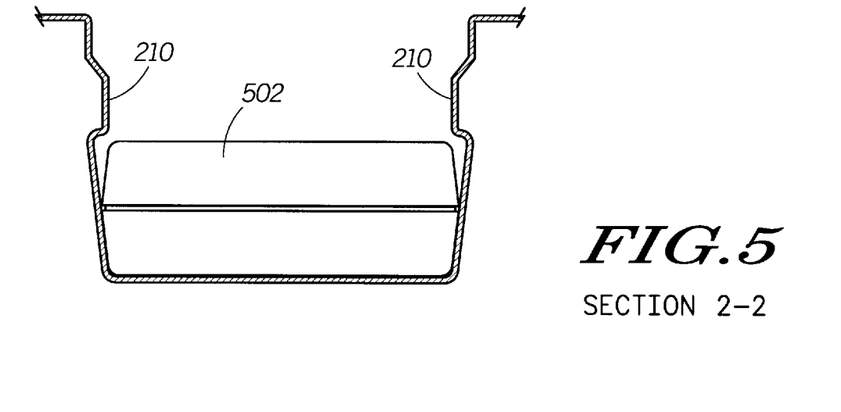
FIG. 5 is a cross-sectional view of the tray of FIG. 2 or FIG. 3 used to securely transport products in the recyclable packaging system in accordance with the preferred embodiment of the present invention.

FIG. 5 is a cross-sectional view of the tray of 200 of FIG. 2 or tray 300 of FIG. 3 used to securely transport products in the recyclable packaging system in accordance with the preferred embodiment of the present invention. After the components have been removed from the tray by the product manufacturer, the tray is then reused to securely retain the product assembled from the components, such as a communication device 502. As was described above, the protrusions 210 securely retain the communication device 502 either by preventing the communication device 502 from popping out of the compartment or by providing a compression fit.

Figure 6:
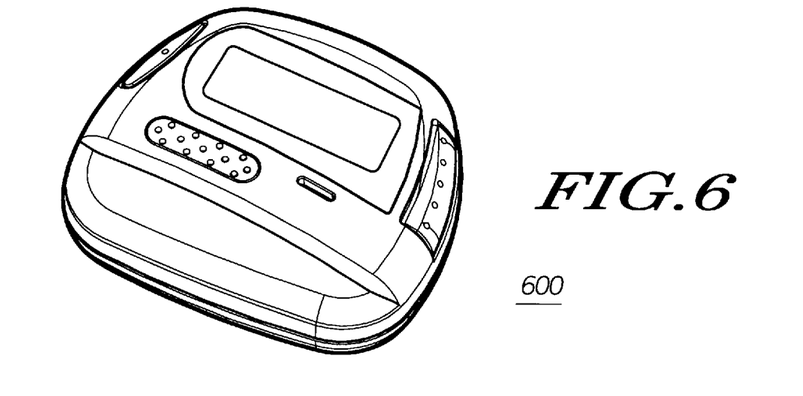
FIG. 6 is a perspective view of a typical product transported in the recyclable packaging system in accordance with the preferred embodiment of the present invention.

FIG. 6 is a perspective view of a typical product 600 transported in the recyclable packaging system in accordance with the preferred embodiment of the present invention. In the example shown, the product 600 being shipped is a small communication device, such as a pager or cellular telephone, although it will be appreciated that many other devices can also be transported as well, such as personal digital assistants, calculators, clocks, etc. It should be noted that the product 600 assembled includes an upper housing portion 604 and a lower housing portion 604 which represent the components 606 manufactured by the component manufacturer.

Figure 7:
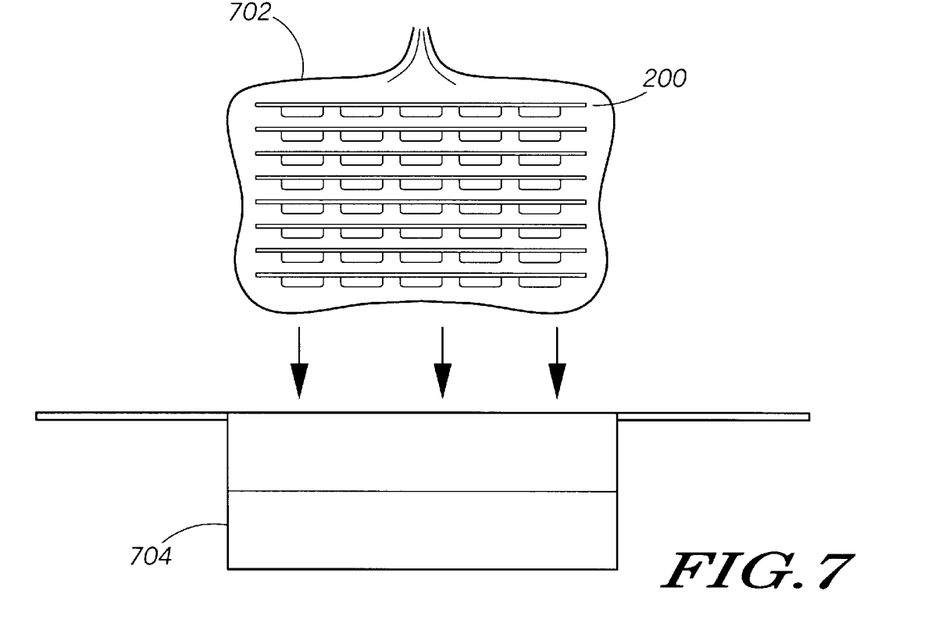
FIG. 7 is a drawing illustrating the recyclable packaging system in accordance with the preferred embodiment of the present invention.

FIG. 7 is a drawing illustrating the recyclable packaging system in accordance with the preferred embodiment of the present invention. One or more trays 200 (or 300), as described above, which have the product 502 placed within compartments 208, are stacked one on top of another and placed into a shipping carton for shipping the trays loaded with components from the component manufacturer to the product manufacturer or loaded with product 502 from the product manufacturer to the purchaser. The shipping carton 704 is by way of example a corrugated cardboard box which does not exceed 26 inches (10.25 cm) in any dimension and which has a maximum weight of 50 pounds (22.75 kg) when loaded, as will be described below. For a tray which is 2 inches (0.8 cm) high, as would be typical for a portable communication device such as a pager or cellular telephone, thirteen trays can be stacked within a box 26 inches (10.25 cm) deep. The uppermost tray is generally empty and functions to protect the product 502 in the trays below. The number of trays which can be stacked is determined by the depth of the shipping carton 704 which is used and the height of the tray. Ideally, the stack-up of the trays is such so as to provide no space between the flaps of the shipping carton and the trays. It will be appreciated that some other form of protection to the product 502 can be provided other than an empty uppermost tray, such as a Styrofoam sheet of a thickness sufficient to fill the space between the trays and the flaps of the shipping carton 704. Prior to placing the trays 200 (or 300) into the shipping carton 704, the trays 200 (or 300) are placed into a plastic bag 702 which seals the product 502 from environmental factors such as contamination by dust, water, solvents and the like, after which the plastic bag 702 with the trays placed therein is loaded into the shipping carton 704. The plastic bag 702 can be reused to return empty trays to the component manufacturer without the need for the corrugated cardboard shipping carton, thereby reducing significantly the cost to return the trays to the resource manager.

In the preferred embodiment of the present invention, the number of trays which are stacked for shipping the product 502 from the product manufacturer 104 is typically reduced from thirteen trays down to three trays (two trays loaded with the product 502) and represents a shipment of fifty devices per shipping carton. It will be appreciated that the number of trays which are stacked to ship the product 502 is largely a function of the requirements for the product 502 by the purchaser and the weight of the shipping carton when shipping the product 502.

Figure 8:
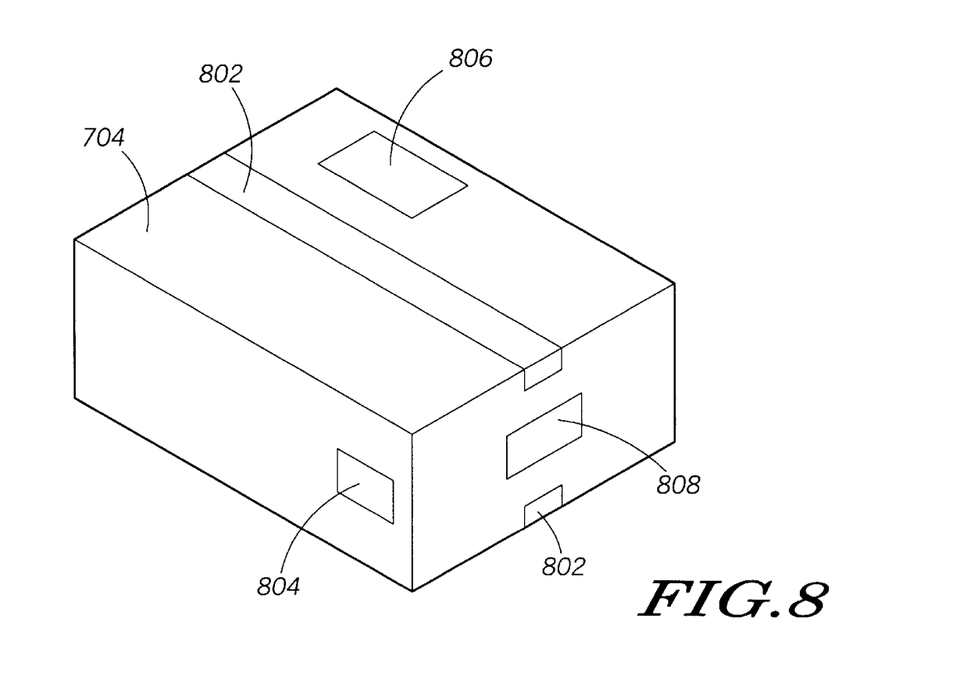
FIG. 8 is a further drawing illustrating the recyclable packaging system in accordance with the preferred embodiment of the present invention.

FIG. 8 is a further drawing illustrating the recyclable packaging system in accordance with the preferred embodiment of the present invention. After the plastic bag 702 containing the trays is loaded into the shipping carton 704, the shipping carton 704 is sealed with a sealing tape 802. A packing list envelope 804, and a shipping label 806 are affixed to the shipping carton 704. It will be appreciated that the packing information may be used to provide the shipping information, in which case only the packing label envelope 804 would be affixed to the shipping carton 704. A tracking label 808 may also be affixed to the shipping carton 704 to enable a transport carrier, such as UPS or Federal Express, the ability to track, for the component manufacturer or the product manufacturer, the shipment of the shipping carton 704. The corrugated shipping carton 704 provides much needed protection to the components and to the product 502 being shipped, and is not required when returning the trays to the resource manager 108, as described above. Because the size of the shipping carton 704 may be different for shipping components from the component manufacturer 102 to the product manufacturer 104 than from the product manufacturer 104 to the purchaser 106, the shipping cartons 704 are typically disposed of by the product manufacturer 104, and since the shipping carton 704 is not required to return the trays to the resource manager 108, the purchaser also disposes of the shipping cartons 704 received.

Figure 9:
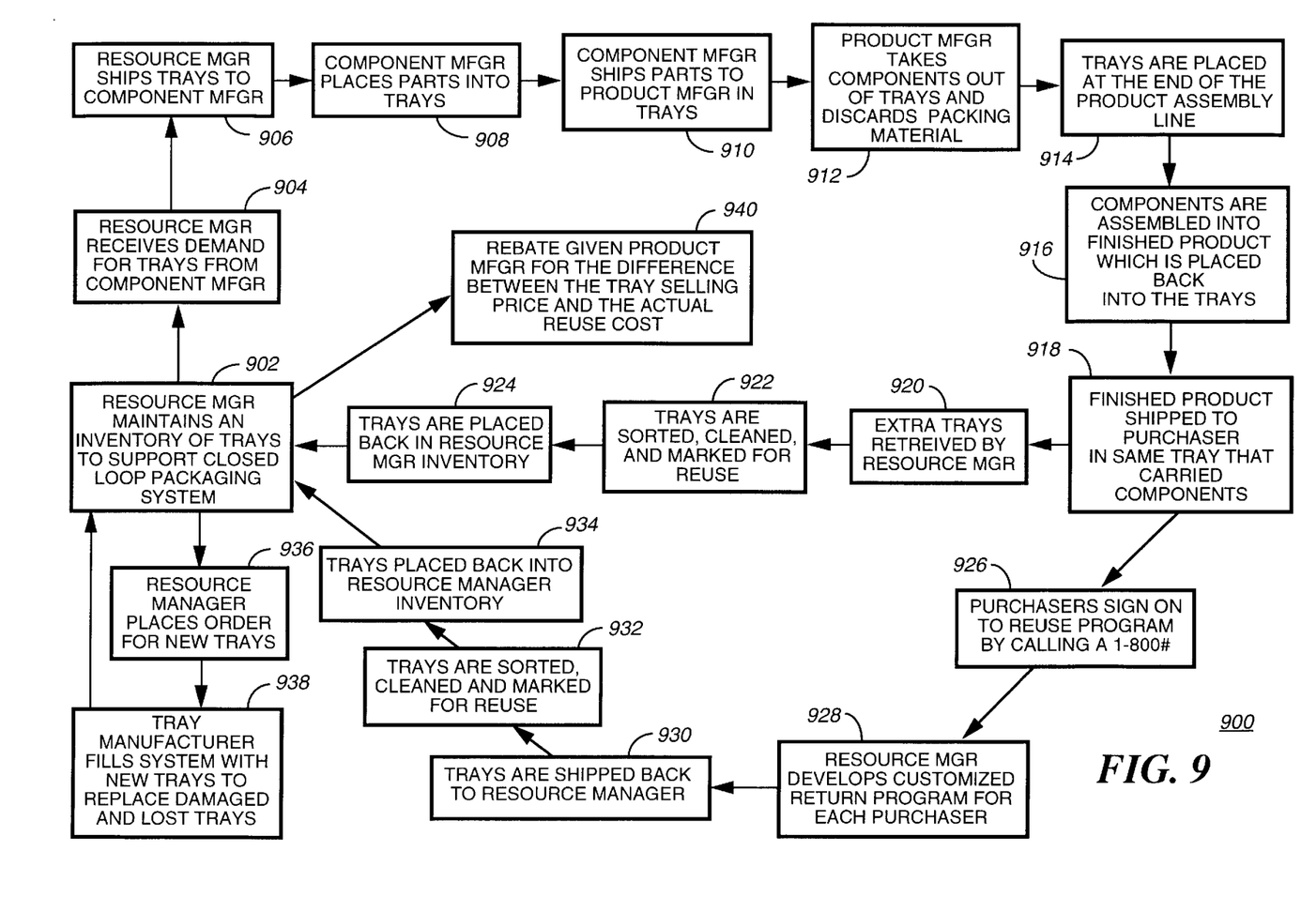
FIG. 9 is a flow diagram describing the recyclable packaging system in accordance with the preferred embodiment of the present invention.

FIG. 9 is a flow diagram describing the recyclable packaging system in accordance with the preferred embodiment of the present invention. Initially, a quantity of trays required to support the manufacture of components and the manufacture of product 502 is negotiated between the component manufacturer and the product manufacturer, and an order for the quantity of trays is placed with a tray manufacturer. The trays which have been produced are shipped to the resource manager 108 who maintains an inventory of trays to support a closed loop recyclable packaging system in accordance with the present invention, at step 902. The initial cost of tray production is paid for by the resource manager 108.

When the resource manager 108 receives a demand for trays from the component manufacturer, at step 904, the resource manager 108 ships the trays to the component manufacturer 102, at step 906. The component manufacturer 102 is charged for the trays which are requested and pays any shipping and handling fees associated with the shipment. As the components are being produced by the component manufacturer 102, the components, such as plastic housings, are placed into the compartments of the trays, at step 908. A single component may be placed by the component manufacturer 102 into each compartment 208 of the tray, or several components may be placed by the component manufacturer 102 into each compartment of the tray, as was described above, at step 908. When several components, such as plastic housings, are placed into the compartments 208 of the trays, two front or upper plastic housing sections, two back or lower plastic housing sections, or a combination of front and back or upper and lower plastic housing sections can be placed into the compartments 208 of the tray depending upon the desires of the product manufacturer 104. Because the components are retained securely in the compartments of the tray, there is no additional processing of the components which is required, such as placing the components into individual plastic bags, thereby reducing the cost of shipping as compared to prior art recyclable packaging systems. The trays loaded with components are bulk packed for shipping to the product manufacturer 104 in a manner as described above, and shipped to the product manufacturer, at step 910. The cost of the trays to the component manufacturer 102 and any shipping and handling charges are factored into the cost of the components to the product manufacturer 104.

The product manufacturer removes the components from the trays and preferably discards the shipping carton 704, at step 912, as was described above. The shipping carton 704 is discarded using the conventional recycling systems for corrugated cardboard. The trays are placed at the end of the assembly line by the product manufacturer, at step 914. The components are assembled into the finished product 502 after which the finished product is then placed into the same tray as used to ship the components, at step 816. The trays loaded with the finished product are bulk packed for shipping to the purchaser 106 in a manner as described above, and shipped to the purchaser, at step 918. The cost of the trays to the component manufacturer 102 and any shipping and handling charges are factored into the cost of the product 502 to the purchaser 106.

When only a single component is placed into each compartment 208 of the tray, there will typically be extra trays which are not required for shipping the product 502 to the purchaser. In this instance, the extra trays are retrieved by the resource manager from the product manufacturer, at step 920. Retrieval generally means picking up one or more pallet loads of trays and transporting the trays to the system manager's facility. The system manager 108 sorts the trays received into trays which can be reused and trays that must be recycled, cleans the trays which can be reused, and then marks the trays which have been cleaned with a mark identifying the number of times the tray has been reused, at step 922. The resource manger 108 recycles damage trays, and damaged trays are defined as those which have been damaged, such as being torn during handling, and trays which have been contaminated with oils, grease or solvents which would contaminate or otherwise damage the components and product 502 being transported. Consequently, cleaning generally requires only blowing out dust and other particulate contaminants from the compartments 208 of the trays with de-ionized air. In the preferred embodiment of the present invention, the trays are marked by clipping the planar edge surface 202 in a manner to indicate the number of times the tray has been reused. All trays which have been reused a predetermined number of times based on historical and/or statistical data relating to tray wear-out are automatically recycled. Trays which have been sorted, cleaned and marked as being reusable are placed back into inventory by the resource manager 108, at step 924.

Purchasers 106 can sign up for a tray reuse program by calling a 1-800#, at step 926. The resource manager develops a customized return program for each purchaser, at step 928. The customized return program depends upon the volume of trays which are received by the purchaser over a predetermined period of time, such as once a week, biweekly or monthly, as will be explained further below. Purchasers who have signed-up for the customized return program are able to ship the trays back to the resource manager, at step 930. The cost of shipping the trays back to the resource manger 108 is borne by the resource manager 108, thereby eliminating the cost of disposing of the trays by the purchaser 106. Trays which have been received by the resource manager 108 are then sorted, cleaned and marked for reuse as described above, at step 932. Trays which have been sorted, cleaned and marked as being reusable are placed back into inventory by the resource manager, at step 934.

When the resource manager 108 determines that there are not a sufficient number of trays for use in shipping components and product 502, or when the number of trays which have been recycled reaches a predetermined value based on historical and/or statistical data relating to tray wear-out the resource manager places an order for new trays with the tray manufacturer, at step 936. The tray manufacturer then produces new trays to replace those which have been damaged or lost, at step 938, and ships the new trays to the resource manager who again maintains the inventory of trays, at step 902.

In the preferred embodiment of the present invention, the product manufacturer 104 contracts with an outside firm to act as the resource manager 108 described above. When the resource manager 108 is contracted by the product manufacturer 104 to oversee tray distribution and recycling of trays as described above, the resource manager 108 can periodically give to the product manufacturer 104 a rebate which is related to the difference between the tray selling price and the actual cost of reuse of the tray, at step 940. The rebate provides an incentive to the product manufacturer 104 to continue to utilize the recyclable packaging system in accordance with the present invention, and to design future products which can be transported in the trays, thereby minimizing cost to the component manufacturer 102, the product manufacturer 104 and the purchaser 106.

Figure 10:
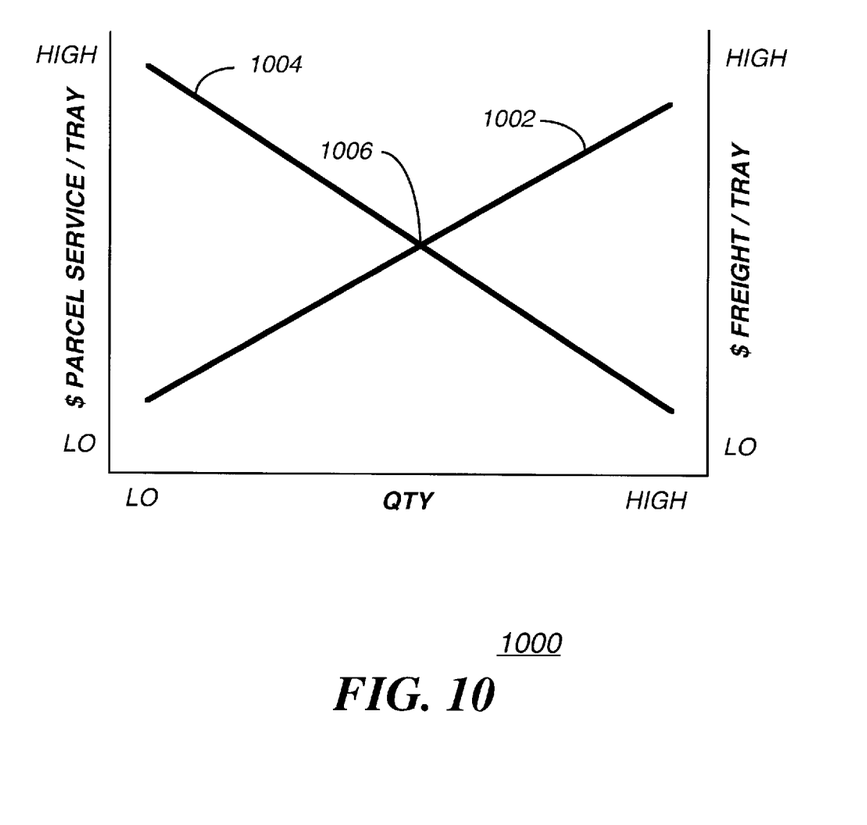
FIG. 10 is a graph illustrating a criteria used to determine a mode of transportation for recyclable packaging system in accordance with the preferred embodiment of the present invention.

FIG. 10 is a graph illustrating a criteria used to determine a mode of transportation for recyclable packaging system in accordance with the preferred embodiment of the present invention. FIG. 10 compares the dollar cost per tray for a parcel service, such as UPS or Federal Express and the dollar cost/tray for freight service as a function of the quantity of trays being shipped. The left ordinate of the graph represents the dollar cost per tray for a parcel service ($PARCEL SERVICE/TRAY), the right ordinate of the graph represents the dollar cost/tray for freight service ($FREIGHT/TRAY), and the abscissa of the graph represents the quantity of trays measured by piece or by weight. Curve 1002 indicates that the cost of parcel service and shows that the cost per tray is relatively low for low tray volumes and increases as the tray volumes increases. Curve 1004 indicates that the cost of freight service, and shows that the cost per tray is relatively high for low tray volumes and decreases as the tray volumes increases. At some point 1006, the cost of parcel service and freight service are equal. The decision as to which type of service to use is then dictated by which service, parcel or freight, provides the lowest cost to return the trays to the service manager 108, and this information is utilized by the resource manager when determining an optimum shipping method for the recovery of empty trays.

The recyclable packaging system according to the present invention provides a system which enables the component manufacturer 102, the product manufacturer 104 and the purchaser 106 the opportunity to save money by recycling the trays which are used to transport components from the component manufacturer 102 to the product manufacturer 104, and which further are used to transport product 502 from the product manufacturer 104 to the purchaser 106. Because the trays are reused, the cost of the trays are amortized over the expected life of the trays, significantly reducing the cost to the component manufacturer 102, the product manufacturer 104 and the purchaser 106. The major cost incurred is only the cost of the shipping container 704 utilized by the component manufacture 102, the product manufacturer 104 or the purchaser 106 and any handling charges involved. The recyclable packaging system according to the present invention provides for the use of readily disposable shipping containers which are customized to the needs of the component manufacturer 102, the product manufacturer 104, and the purchaser 106. The shipping container 704 utilized by the component manufacturer 102 allows for bulk shipment of a large number of components in a single shipping container 704, thereby efficiently transporting, at the lowest cost, the components to the product manufacturer 104 in a mode which best protects the components from damage. Likewise, the shipping container 704 utilized by the product manufacturer 104 allows for bulk shipment of the product 502 in a shipping container 704 which coincides with the quantities purchased by the purchaser 106, thereby efficiently transporting, at the lowest cost, the product 502 to the purchaser 106 in a mode which best protects the product 502 from damage. The purchaser 106, when signed up to the recycling program, incurs no expense to return the empty trays to the resource manager 108, and the empty trays are returned in a plastic bag 702 which significantly reduces the cost incurred to transport the trays for reuse. The trays are designed to be able to accommodate a variety of components and finished products, thereby reducing the cost of the tray by being able to purchase trays in volume from the tray manufacturer. The cost of the trays is further reduced by using 100% post recycled material, which creates a market for recycled material and makes it easier for the component manufacturer 102, the product manufacturer 104 and the purchaser 106 to recycle old, worn-out trays.

The recyclable packaging system according to the present invention creates a central database controlled by the resource manager 108. The database is accessible by the purchasing departments of the component manufacturer 102 and the product manufacturer 104, and enables the resource manager 108 the ability to forecast tray requirements, and to insure that an adequate number of trays are available in inventory for the needs of the component manufacturer 102 and the product manufacturer 104. The resource manager 108 insures that trays are retrieved from the purchaser 106, and as such satisfies the purchaser's desire to recycle the empty trays. The trays because they are recycled are less expensive than new trays to the component manufacturer 102, the product manufacturer 104 and the purchaser 106.

In summary, the recyclable packaging system according to the present invention combines three solutions to three problems to create a recyclable packaging system that saves money and insures packaging materials are recycled. The three solutions provided by the recyclable packing system include a multi-use tray design, a central database, and an effective reuse system. The recyclable packaging system in accordance with the present invention can be operated by an independent resource manger 108, or overseen by the product manufacturer 106, in either case the system providing a significant cost savings to the component manufacturer 102, the product manufacturer 104 and the purchaser 106.

We claim:

1. A process for transporting goods between a component manufacturer, a product manufacturer, and a purchaser, said process comprising the steps of:

(a) providing a tray having a plurality of compartments which are used to retain securely components which are manufactured by the component manufacturer, and further which are used to retain securely a finished product manufactured by a product manufacturer;

(b) shipping the tray from the component manufacturer with the components inserted into the plurality of compartments to the product manufacturer;

(c) removing the components from the tray;

(d) assembling one or more of the components into the finished product;

(d1) inserting the finished product into the plurality of compartments;

(e) shipping the finished product in the tray from the product manufacturer to the purchaser;

(f) returning the tray to the component manufacturer after the finished product has been removed from the tray by the purchaser; and (g) repeating steps (b) through (f).

2. The process for transporting goods according to claim 1, further comprising the steps of:
   placing one or more trays into a shipping carton for shipping trays from the component manufacturer to the product manufacturer.

3. The process for transporting goods according to claim 1, further comprising the steps of:
   placing one or more trays into a shipping carton for shipping trays from the product manufacturer to the purchaser.

4. The process for transporting goods according to claim 1, further comprising the steps of:
   placing one or more trays into a shipping carton for shipping trays from the purchaser to the component manufacturer.

5. The process for transporting goods according to claim 1, wherein fewer trays are required to ship the product to the purchaser than are required to ship the components from the product manufacturer, and said process further comprises the step of:
   returning trays not used by the product manufacturer to ship the product to the purchaser to the component manufacturer.

6. The process for transporting goods according to claim 1, wherein said step of providing is managed by a resource manager.

7. The process for transporting goods according to claim 6, wherein the resource manager is the product manufacturer.

8. The process for transporting goods according to claim 6, further comprising the steps of:
   tracking a location and quantity of trays at the component manufacturer and product manufacturer; and
   coordinating a return of the trays from the purchaser to the component manufacturer.

9. The process for transporting goods according to claim 8, further comprising the steps of:
   accumulating, for a predetermined period of time, trays at the purchaser for return to the component manufacturer; and
   determining an optimum shipping method in accordance with a number of trays accumulated over the predetermined period of time.

10. The process for transporting goods according to claim 6, further comprising the steps of:
    returning the tray to a resource manager after the product has been removed from the tray by the purchaser; and
    cleaning the tray prior to returning the tray to the component manufacturer.

11. The process for transporting goods according to claim 10, further comprising the steps of:
    discarding for recycling damaged trays; and
    replacing the damaged trays with new trays.

12. A process for transporting goods between a component manufacturer, a product manufacturer, and a purchaser, said process comprising the steps of:

(a) providing a tray having a plurality of compartments which are used to retain securely components which are manufactured by the component manufacturer, and further which are used to retain securely a finished product manufactured by a product manufacturer;

(b) shipping the tray from the component manufacturer with the components inserted into the plurality of compartments to the product manufacturer;

(c) removing the components from the tray;

(d) assembling one or more of the components into the finished product;

(d1) inserting the finished product into the plurality of compartments;

(e) shipping the finished product in the tray from the product manufacturer to the purchaser;

(f) returning the tray to a resource manager after the finished product has been removed from the tray by the purchaser;

(g) shipping the tray from the resource manager to the component manufacturer; and (h) repeating steps (b) through (g).

13. The process for transporting goods according to claim 12, further comprising the steps of:
    placing one or more trays with components into a shipping carton for shipping components from the component manufacturer to the product manufacturer; and
    discarding for recycling the shipping carton when the one or more trays are received by the product manufacturer.

14. The process for transporting goods according to claim 12, further comprising the steps of:
    placing one or more trays into a shipping carton for shipping products from the product manufacturer to the purchaser; and discarding for recycling the shipping carton when the one or more trays are received by the purchaser.

15. The process for transporting goods according to claim 12, further comprising the steps of:

tracking a location and quantity of trays at the component manufacturer, product manufacturer and purchaser; and coordinating a return of the trays from the purchaser to the component manufacturer, wherein said step of tracking and said step of coordinating are managed by the resource manager.

16. The process for transporting goods according to claim 15, further comprising the steps of:

accumulating, for a predetermined period of time, a number of trays by the purchaser to be returned to the component manufacturer; and determining an optimum shipping method in accordance with the number of trays accumulated over the predetermined period of time, wherein said step of determining is managed by the resource manager.

17. The process for transporting goods according to claim 12, further comprising the steps of:

returning trays to a resource manager after the product has been removed from the trays by the purchaser; and cleaning the trays prior to returning the trays to the component manufacturer, wherein said step of cleaning is managed by the resource manager.

18. The process for transporting goods according to claim 12, wherein the resource manager is the product manufacturer.

19. The process for transporting goods according to claim 12, wherein fewer trays are required to ship the product to the purchaser than are required to ship the components from the product manufacturer, and said process further comprises the step of:

returning trays which are not used by the product manufacturer to the resource manager.

20. The process for transporting goods according to claim 19 further comprising the step of determining an optimum shipping method to return trays from the product manufacturer to the resource manager, wherein said step of determining is managed by the resource manager.

* * * * *